United States Patent [19]

Ortlieb

[11] Patent Number: 4,933,618
[45] Date of Patent: Jun. 12, 1990

[54] CHAIR FOR SUNBATHING

[76] Inventor: Johann F. Ortlieb, 57 Bath Street, St. Helier, Jersey, Channel Islands

[21] Appl. No.: 257,844

[22] Filed: Oct. 14, 1988

[30] Foreign Application Priority Data

Oct. 16, 1987 [GB] United Kingdom ............... 8724345
Oct. 10, 1988 [GB] United Kingdom ............... 8822884

[51] Int. Cl.$^5$ ............................................. G05B 1/06
[52] U.S. Cl. .................................... 318/640; 297/217; 128/372; 128/376
[58] Field of Search .................. 318/640; 297/217; 128/372, 376

[56]  References Cited

U.S. PATENT DOCUMENTS 3,908,666  9/1975  Osborne ........................... 128/372
4,140,128  2/1979  Van Der Schaaf ................ 128/376
4,379,588  4/1983  Speice ............................... 297/217
4,612,488  9/1986  Uhlemann et al. ............ 318/640 X
4,720,140  1/1988  Change, III ..................... 297/217

Primary Examiner—William M. Shoop, Jr.
Assistant Examiner—Saul M. Bergmann
Attorney, Agent, or Firm—Fleit, Jacobson, Cohn, Price, Holman & Stern

[57]  ABSTRACT

A chair for sunbathing has a stationary base (1) carrying a rotatable support (2) for a seating or lying surface (4). A motor (7) is controlled by a control unit (10) in a chamber (8) which also contains sensors (9) responsive to ambient sunlight whereby the motor is caused to rotate until it has aligned the chair with the sun's rays. The motor can also be powered by means responsive to solar energy.

5 Claims, 4 Drawing Sheets

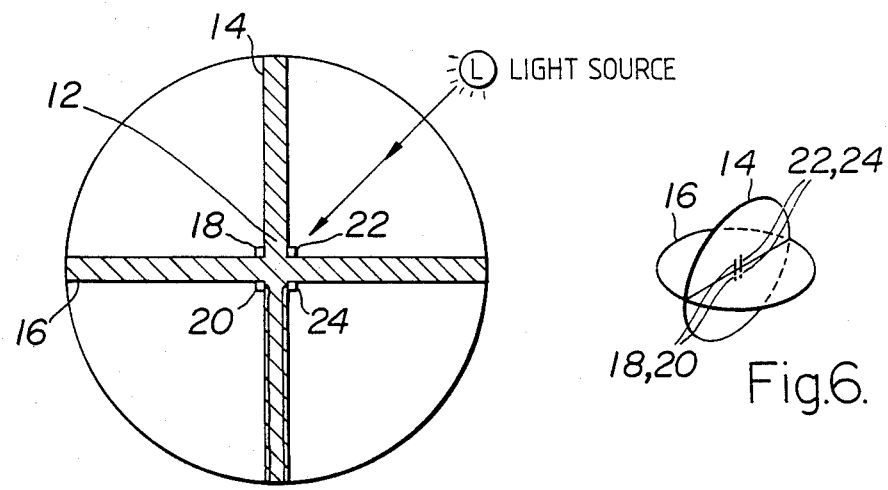
Fig. 4.
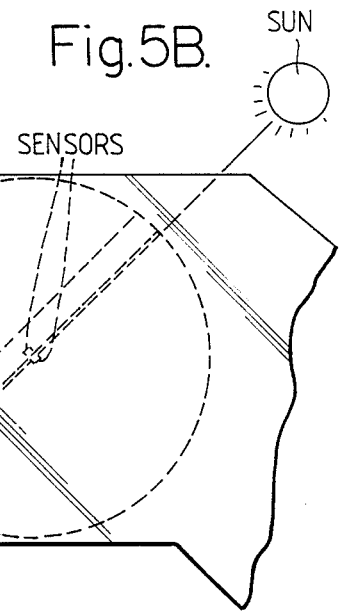
Fig.6.
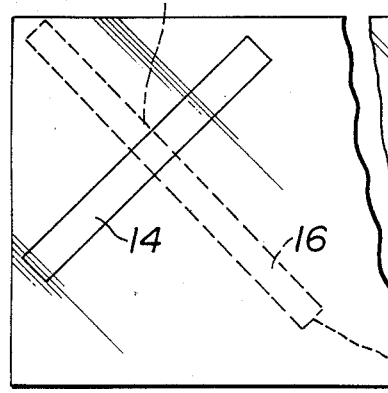
Fig.5A.
Fig.5B.

CHAIR FOR SUNBATHING

BACKGROUND AND SUMMARY OF THE INVENTION

This invention relates to a chair for sunbathing and has for its primary object to provide a movable chair with means for positioning the chair so as to ensure that the occupant receives the maximum amount of sunlight. It is to be understood that the term "chair" is to be interpreted as covering any article of furniture suitable for sitting, lounging or lying on such as for example, a bed.

According to the invention in its broadest aspect, there is provided a rotatable chair, drive means for rotating the chair, means to produce a signal representing the deviation in the actual position of the chair from that position in which it would be directly facing the sun, and control means responsive to the signal to cause the drive means to rotate the chair to eliminate the deviation.

According to another aspect of the invention there is provided a rotatable chair, drive means for rotating the chair, sensing means responsive to the ambient sunlight to produce a signal representing the deviation in the actual position of the chair from that position in which it would be directly facing the sun, and control means responsive to the signal to cause the drive means to rotate the chair to eliminate the deviation.

According to a preferred form of the invention, the chair is for use on a ship or other moving support, and the drive means is energized by solar power as well as being controlled by solar power.

An embodiment of the invention will now be described by way of example with reference to the accompanying drawings in which.

BRIEF DESCRIPTION OF THE DRAWINGS

FIG. 4 is a diagram showing the arrangement of the sensors on a sensor supporting structure, FIG. 5A is a diagram showing the panel of solar cells, FIG. 5B is a diagram illustrating the angled positioning of the sensors, and FIG. 6 is a perspective view of the perpendicular intersecting discs comprising the sensor supporting structure.

DETAILED DESCRIPTION OF THE DRAWINGS

Figure 1:
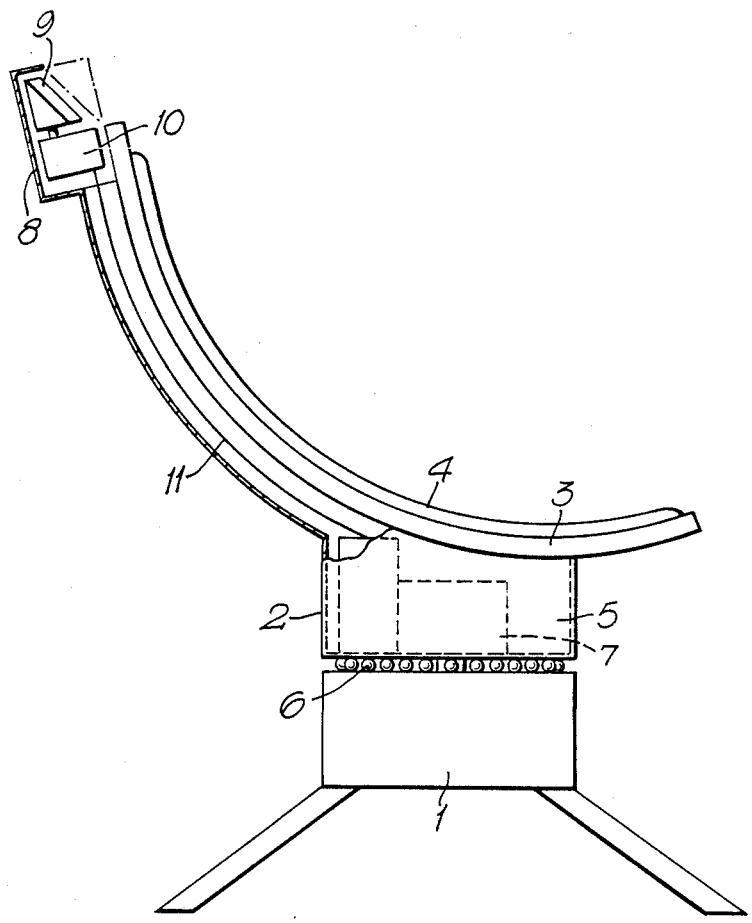
FIG. 1 is a diagram of a chair provided with a device for positioning it for sunbathing.

In constructing a chair in accordance with this embodiment, reference is first made to FIG. 1. A sturdy stationary base 1 as a supporting frame for the chair and a rotatable support 2 to which is attached a body 34 carrying the actual sitting or lying surface 4 of the chair. The body 3 of the chair is made of durable light-weight substances, such as those which do not conduct electricity (to avoid the risk of lightning) and is hollow inside at two locations. One hollow chamber 5 is at the base of the chair to house ball-bearings 6 on which the chair can rotate as well as drive means in the form of a motor 7, and the other chamber 8 is attached to or forms part of the backrest of the chair at the top (which could be entirely hollow) to house a panel 9 of solar-cells for powering the motor and light-sensors, and a control unit 10 containing a micro-computer, electro-magnetic relays, integrated circuits, thyristors and other components connected to the motor 7 by a connection 11. The solar-panel is sufficiently large to harness enough power to activate the micro-computer. The chamber 8 is situated as shown in the backrest of the chair above the head-level and facing away from the backrest at an angle of ninety degrees relative to the anticipated direction of the sun.

The sun-tracking device comprises a sensor holding structure 12 (shown in FIGS. 4 and 6) which comprises perpendicular discs 14 and 16. The sensor holding structure 12 supports two left sensors 18 and 20 and two right sensors 22 and 24.

The panel 9 supporting the sensor holding structure 12 is placed in the panel-box 8, not vertically, but as shown in FIG. 5B, at a reclining angle of approximately forty-five degrees relative to horizontal. Therefore, the rays of the sun can strike the sensors 18-24 parallel to the disc 14 or 16 of the sensor holding structure 12. However, the solar cells, indicated at 25, are positioned on the surface of either of the discs 14 or 16 so that they receive sunlight in a more direct manner, as shown in FIG. 5A.

If the sunbeams should fall onto the left sensors 18 and 20, then an electric current will be generated and the top-part of the chair will swivel from left to right until it directly faces the sun with the left sensors 18 and 20 acting as an ON-switch and the right sensors 22 and 24 acting as an OFF-switch. This movement is produced by the motor in a left to right motion under the control of one of the electromagnets acting as relays. The computer's own reaction-time can be used to account for the time lapse which is necessary before any further sun-tracking can be undertaken.

Since it is logically evident that at that given instant the sun will have moved to the right (or more exactly, the earth will have spun from left to right) a counter-movement will be required in order to track the sun. However, for rotating the chair in the opposite direction, the sunbeams will be incident on the right sensors 22 and 24, with the right sensors now acting as an ON-switch and the left sensors 18 and 20, as soon as alignment with the sun is achieved, acting as an OFF-switch.

After a short time-interval this action is repeated. As long as there is sufficient daylight and the solar-panel-box is not occluded by an object, the chair will always align itself with the sun.

It is considered unlikely that the chair will be used to a great extent in the far Northern or Southern Hemisphere, however the angle of inclination of the panel (carrying sensor holding structure 12) will have to be considered as important. Obviously on the equator, with the sun moving directly overhead, an adjustable sun-tracking circuit-board can accommodate the demands of this geographical location. The size and arrangement of the light-sensors will be paramount in deciding the intervals of the individual sun-tracking movements.

Applications of this invention are manifold, as for example: on moving Luxury Ocean Cruise Liners, also in prestigious Hotels, Holiday Resorts and Luxury Homes. Moreover, a portable version of this invention could find common use in gardens or on beaches. As parts of this mechanisms will have to be kept free from sand and dust-particles, protective coverings will have to be considered in the manufacture.

Further details will now be given of the driving motor and the micro-computers used in this invention.

The motor 7 is an electro-magnetic reversible D.C.-A.C. motor, capable of executing minute movements.

A thyristor-fed reluctance motor (D.C.), could be used, for example, which typically carries sufficiently high inductance not to need excitation (and allows positioning).

Alternatively, a suitably phased high speed electromotor (reduced in gearing) could be used. A rotating amplifier could provide excitation, if needed. Overshoot at the output-shaft should not pose a problem. The actual starting torque of the rotor can be calculated and accordingly calibrated to overcome the load torque.

In practice, under optimal load conditions (e.g. a very heavy person lying on the device) only small angular movements would have to be obtained as rotor-output. The device would normally have been in operation long before any actual sunbathing could have been undertaken, and therefore only small adaptive tracking movements will be required, between intervals.

Figure 3:
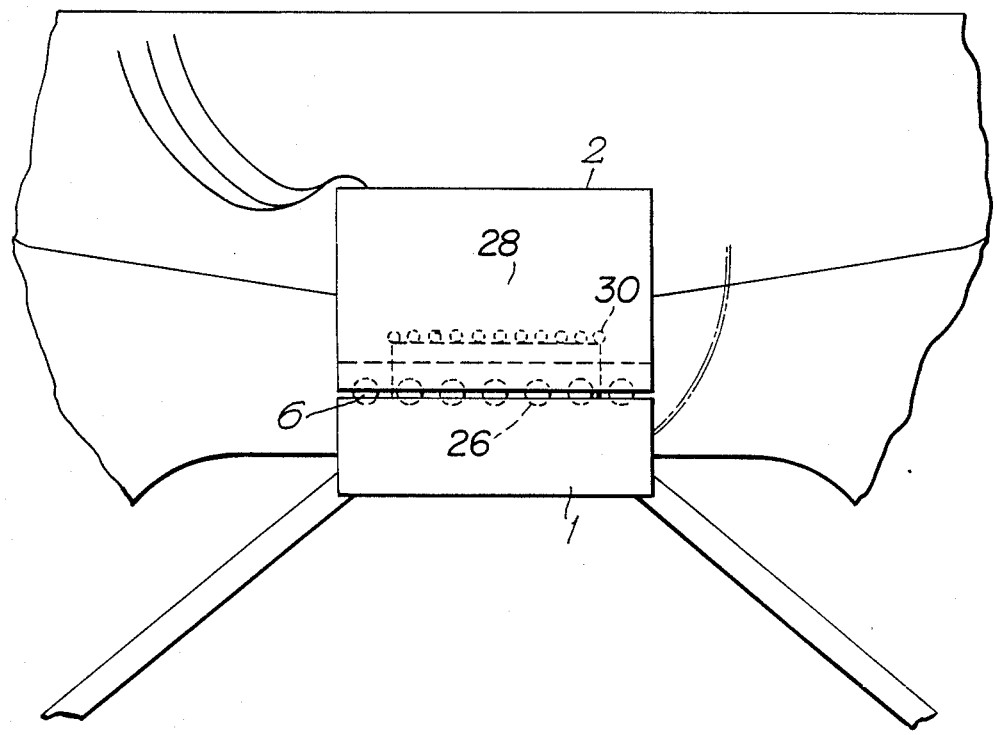
FIG. 3 is a diagram of the lower part of the chair with its driving motor.

Referring now to FIG. 3, the stator 26 and the rotor 28 of the motor, are shown incorporated in the bearing 6 of the device and forming together with the motor 7 the chair-driving mechanism. The stator 26 rests on top of the base 1, to which it is securely fixed while the rotor 28 is carried by the rotatable support 2 as shown in FIG. 3.

Attached safely to the back of the rotor is the complete upper structure of the device (which makes up the rotating part thereof, see FIG. 1).

Two rows of bearings 6 and 30 in an appropriate setting, as well known in the art, are provided and account for journal (radial) and axial (thrust) stress.

The rotating axis of the motor 7 coincides with the axis of the chair. Again, the motor 9 can be powered by an adequate array of solar cells, and in addition the micro-computer in the control unit 10 may also be supplied in this way.

It is evident that to compensate for rocking and friction, great structural and motor-stability is of importance in the construction of the device. A wide output-shaft therefore could be used. Furthermore, the rotor can be set as a cage over the stator to allow for an ample surface area upon which the upper frame of the device is mounted.

It will be essential for the wiring to be concentrated in the rotor part of the device as shown diagrammatically in FIG. 3. If this provision is omitted, then full 360 degree rotation (of the upper frame of the device) in either direction cannot be achieved. However, because electric contact can be established by having the primary winding on the stator 26, full 360 degree rotation is provided.

Figure 2:
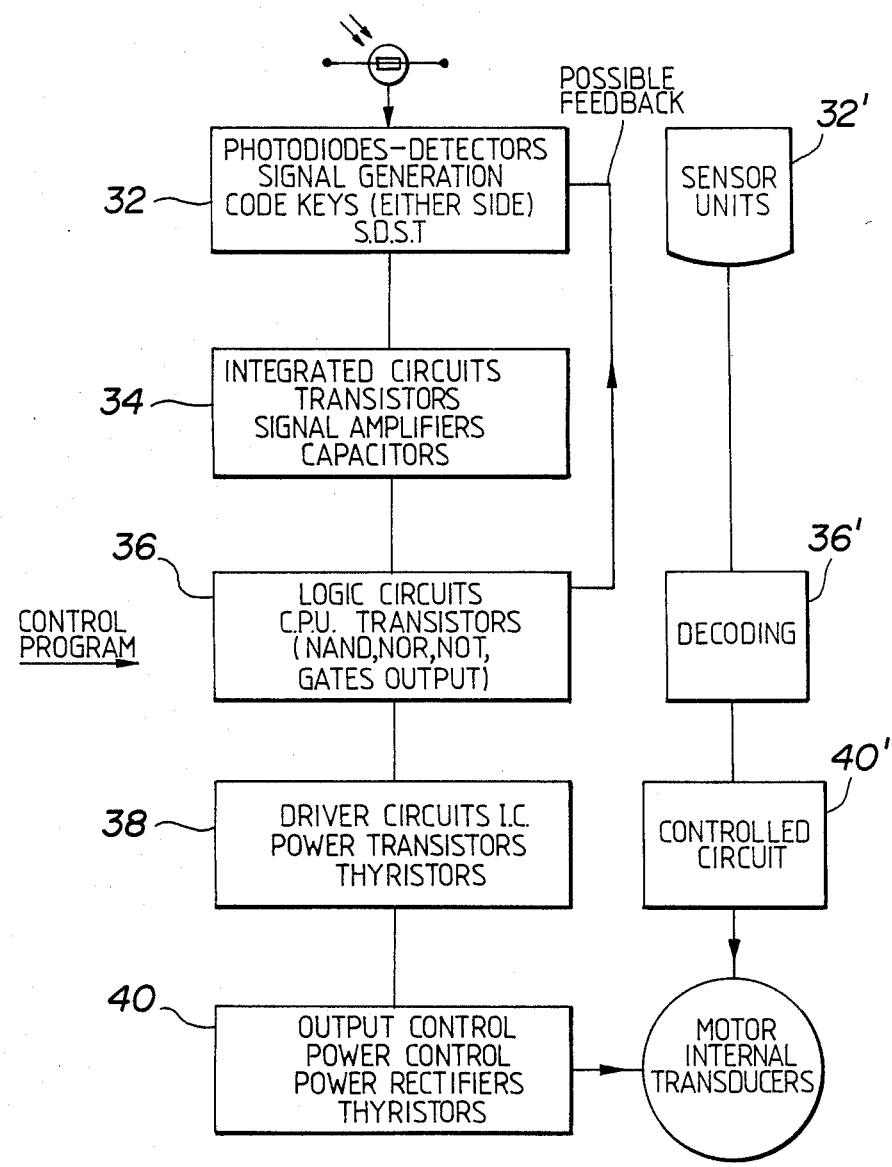
FIG. 2 is a block diagram of the device for positioning the chair for sunbathing.

Referring now to FIG. 2, the components and operation of the control unit will now be described. The micro-computer in the control unit 10 interfaces with a relay-driving interface (with analogue controller) which comprises an array of receiver circuits to allow the micro-computer to switch the motor 7 on or off. Such an interface is well known in the art. To obtain speed control, an analogue converter (possibly with VCO and amplifier and buffered output) is required, as is also well known in the art.

As it is likely that the device (in order to go onto the production line) will be purpose-built, a quite simple microprocessor system is preferred. In this case it is conceivable that the complete electronic circuitry could be assembled on a single sizeable I.C.-BOARD (inclusive of microprocessor and relay-controlling circuitry).

Because the relay-driving interface (for power control) is preferably controlled directly from a data-line of the micro-computer in the control unit 10 as in a microprocessor system), a latching and a decoding circuit, will be required, as is well known in the art, in order to obtain enabling action from the computer.

Preferably, the micro-computer is powered by a panel of solar-cells, possibly in conjunction with a rechargeable nickel cadmium battery. (A single solar-cell can produce 0.5 V. In an array, 45 V are readily obtainable).

The left side of FIG. 2 illustrates the typical electronic components used to perform the function indicated in the adjacent block on the primed right side of FIG. 2.

The photocells (semiconductor diodes) in block 32, as soon as illuminated, trigger (single pulse) a spring-loaded solid state code key, which momentarily closes an electronic circuit. This wave-signal can be amplified through a transistor indicated in block 34 and fed into the micro-computer's CPU indicated at block 36. Following its control program the micro-computer will then send binary instructions via its associated circuits (e.g. relay interface) to switch the motor on via driver circuits indicated in block 38 and output control in block 40, which results in a motion of the rotor in one of the two possible directions (left-right or right-left).

There are two units of identical light-sensors to the device. As soon as illumination on the second unit of sensors is obtained, the corresponding code key will close momentarily, but the incoming signal will be read by the "CPU" as an I/O instruction to turn the motor off.

By looping the program with a feedback indicated in FIG. 2, the micro-computer can be kept occupied until the motor has come to rest. After a mandatory time interval (depending also on the speed of the motor) the micro-computer will accept a further signal from the group of light sensors which happens to be exposed to illumination.

Logically, in the early morning (or as soon as the device starts to operate, due to sufficient solar energy) one initial large tracking movement will be required, following which all further tracking movements will be made continuously into the same direction namely from right to left (ideally till sunset).

The sensitivity of the photocells is crucial for the functioning of the light-sensors 18–24 (and of course the whole device). The sensors will have to be sensitive to ULTRA-VIOLET LIGHT, but insensitive to normal visible daylight. The waves in that frequency fall into the spectrum of a phototransistor. The latter can also pick up infra-red waves, but since the microcomputer is dependent on a high amount of solar energy (for power), this would not work.

The panel(s) of solar cells 25 (as power supply for the micro-computer and the motor) will start to operate before the light sensors, due to the former's sensitivity to normal, visible daylight.

Means can be provided in the form of a wheel, lever or handle by which the chair can be manually rotated by a seated occupant.

Non-electric means can be provided for rotating the chair such as hydraulic or gas-pressure power sources controlled by appropriate valves or ventils. One could also use the energy stored in spring means as a result of the impact of the person when sitting in the chair.

Means could also be provided for causing the chair to rotate continuously in line with the earth's rotation under, for example, the control of compass mechanism.

I claim:

1. A rotating sunchair apparatus for use on a non-stationary support, comprising:

stationary base support means;

a chair body having a surface for supporting a user and having a head rest portion;

rotatable support means for supporting said chair body;

motor means positioned in said stationary base support means, and rotatably connected in axial alignment with said rotatable support means;

sun light sensing means positioned above said head rest portion of said chair body for receiving incident sun light and for rotation with said chair body, said sun light sensing means comprising a chamber containing a sensor supporting structure comprised of first and second discs, said first and second discs being perpendicular and intersecting each other, first and second groups of light sensors attached to said sensor supporting structure so that said first and second groups of sensors are partitioned and isolated from each other;

solar sensing and energy storage means comprising solar energy storage cells for converting sun light into electrical energy; and control means electrically connected to said motor means and said sun light sensing means for controlling the motor means to rotate said chair body relative to said base support means upon detecting a deviation in the alignment of said chair relative to the sun, said control means effecting rotation of said motor in increments to the left or the right up to 360 degrees depending upon which of said first or second group of light sensors detects sun light incident thereon so that said chair body can be maintained in a predetermined alignment with the sun.

2. The rotatable sunchair apparatus of claim 1, wherein said sensor supporting structure is positioned at a predetermined angle with respect to horizontal so that for sunlight to be incident on one of said plurality of sensors, the sunlight must be substantially parallel to one of said first and second discs.

3. The rotatable sunchair apparatus of claim 2, wherein said control means is operable to trigger said motor means to rotate to the left when said first group of sensors receive incident light and to rotate to the left when said second group of sensors receive incident light.

4. The rotatable sunchair apparatus of claim 1, wherein said motor comprises a stator and a rotor, said rotor being fixed to the rotatable support means and said stator being fixed to the base support means.

5. The rotatable sunchair apparatus of claim 1, wherein said motor means is powered by said plurality of solar sensing and storage cells.

* * * * *